(12) United States Patent
Ginn et al.

(10) Patent No.: US 10,041,528 B2
(45) Date of Patent: Aug. 7, 2018

(54) PIN JOINT FOR COUPLING COMPONENTS (71) Applicant: Caterpillar Inc., Peoria, IL (US)

(72) Inventors: Ronald M. Ginn, Morton, IL (US);
Chad M. Arnold, Peoria, IL (US);
Daniel J. Sordelet, Peoria, IL (US)

(73) Assignee: Caterpillar Inc., Deerfield, IL (US)

(*) Notice: Subject to any disclaimer, the term of this patent is extended or adjusted under 35 U.S.C. 154(b) by 0 days.

(21) Appl. No.: 15/288,064

(22) Filed: Oct. 7, 2016

(65) Prior Publication Data
US 2018/0100539 A1 Apr. 12, 2018

(51) Int. Cl.
F16C 11/04 (2006.01)
F16C 17/02 (2006.01)
F16C 43/02 (2006.01)
F16C 33/74 (2006.01)
B23P 15/00 (2006.01)
F16J 15/34 (2006.01)

(52) U.S. Cl.
CPC ............ F16C 11/04 (2013.01); B23P 15/003 (2013.01); F16C 17/02 (2013.01); F16C 33/743 (2013.01); F16C 43/02 (2013.01); F16J 15/3456 (2013.01); F16C 2226/60 (2013.01)

(58) Field of Classification Search
CPC .......... F16C 11/04; F16C 17/02; F16C 43/02; F16C 33/743; F16C 2226/60; F16C 2350/26; F16J 15/3456; B23P 15/003
USPC ......... 384/95, 129, 130, 210, 249, 276, 280, 384/282, 416; 277/336, 549; 411/638, 411/686, 815, 236, 245, 295; 403/154, 403/158
See application file for complete search history.

(56) References Cited

U.S. PATENT DOCUMENTS 2,162,944 A * 6/1939 Dunford ................ A43D 87/00
12/92
2,322,004 A * 6/1943 Fast ........................ F16C 27/02
384/125

(Continued)

FOREIGN PATENT DOCUMENTS

CH 637734 8/1983
GB 994987 6/1965

(Continued)

OTHER PUBLICATIONS

Rem870: Shotgun Chokes Explained (Cylinder, Improved Cylinder, Modified, Full) [online], (retrieved on Oct. 5, 2016) Retrieved from Rem870 website using internet <URL: http://www.rem870.com/2012/05/06/shotgun-chokes-explained-cylinder-improved-cylinder-modified-full/>.

Primary Examiner — Marcus Charles
(74) Attorney, Agent, or Firm — Timothy A. Parker; Bart A. Fisher (57) ABSTRACT A pin joint for coupling a first component with a second component is provided. The pin joint includes a shell disposed within an opening in the first component. The shell has a bore and a coupling portion. The pin joint also includes a sleeve disposed concentrically within the bore of the shell. The pin joint further includes a retainer disposed proximal to an end of the sleeve and detachably coupled to the coupling portion of the shell. The retainer is configured to axially retain the sleeve within the bore of the shell. The pint joint includes a pin received through the sleeve and the retainer. The pin is engaged with the second component.

20 Claims, 6 Drawing Sheets

(56) References Cited

U.S. PATENT DOCUMENTS

| | | | | |
|---|---|---|---|---|
| 4,251,182 | A * | 2/1981 | Schroeder | B62D 55/0887 384/276 |
| 4,398,862 | A * | 8/1983 | Schroeder | E02F 9/006 384/249 |
| 4,815,903 | A * | 3/1989 | Skidmore, Sr. | B23Q 1/70 409/131 |
| 5,080,183 | A * | 1/1992 | Schumacher | E21B 10/24 175/228 |
| 7,309,186 | B2 * | 12/2007 | Oertley | E02F 3/283 172/810 |
| 7,367,739 | B2 * | 5/2008 | Brock | F16J 15/3236 403/288 |
| 7,402,927 | B2 | 7/2008 | Belpanno et al. | |
| 7,997,659 | B2 | 8/2011 | Oertley et al. | |
| 8,333,528 | B2 * | 12/2012 | Oertley | F16J 15/344 37/466 |
| 8,459,894 | B2 * | 6/2013 | Svensson | F16C 11/045 37/466 |
| 9,140,302 | B2 | 9/2015 | Kane | |
| 2003/0102635 | A1 * | 6/2003 | Akita | E02F 9/006 277/549 |
| 2006/0093246 | A1 * | 5/2006 | Akita | E02F 9/006 384/279 |
| 2008/0141513 | A1 * | 6/2008 | Livesay | B21K 25/00 29/244 |
| 2008/0265667 | A1 * | 10/2008 | Livesay | B62D 55/21 305/202 |
| 2009/0079256 | A1 | 3/2009 | Oertley et al. | |
| 2009/0110530 | A1 * | 4/2009 | Harshberger | E02F 3/3411 414/686 |
| 2012/0267947 | A1 * | 10/2012 | Johannsen | B62D 55/0887 305/103 |
| 2015/0198204 | A1 * | 7/2015 | Abrudan | B23P 15/003 384/210 |
| 2016/0363163 | A1 | 12/2016 | Khera et al. | |

FOREIGN PATENT DOCUMENTS

| | | | | |
|---|---|---|---|---|
| JP | 10252837 | A * | 9/1998 | F16H 1/46 |
| WO | 2016018587 | | 2/2016 | |

* cited by examiner

FIG. 6

PIN JOINT FOR COUPLING COMPONENTS

TECHNICAL FIELD

The present disclosure relates generally to a pin joint, and more particularly to a method of assembling the pin joint for coupling components of a machine.

BACKGROUND

Machines with earth moving or material handling capabilities, such as wheel loaders, track loaders, backhoes and the like, typically include multiple components connected using one or more pin joints for allowing pivotal movement between the components. Typically, the pivotal joints include a pin and a bearing mounted within bores of the components for supporting pivotal movement. The bearing and the pin may experience wear during operation of the machines. In particular, various interfacing surfaces between the pin and the bearing may experience galling due to adhesion between the interfacing surfaces. This may lead to failure of either the bearing or the pin or both at one or more interfacing surfaces. Failed components may be expensive to replace. Further, replacement of the components may also require special tools and be time consuming.

U.S. Pat. No. 2,322,004 describes a structure including a plurality of relatively rotatable members, a flexible annular element mounted between said members and arranged to transmit a load from one to another. One of plurality of relatively rotatable members has a face forming a portion of a substantially spherical surface. The flexible annular has a face forming a similar spherical surface when tensioned. The structure also includes a means for tensioning said member only intermediate its ends at spaced points about its circumference to deform said face.

SUMMARY OF THE DISCLOSURE

In one aspect of the present disclosure, a pin joint for coupling a first component with a second component is provided. The pin joint includes a shell disposed within an opening in the first component. The shell further includes a bore and a coupling portion. The pin joint further includes a sleeve disposed concentrically within the bore of the shell. The pin joint also includes a retainer disposed proximal to an end of the sleeve and detachably coupled to the coupling portion of the shell. The retainer is configured to axially retain the sleeve within the bore of the shell. The pin joint also includes a pin received through the sleeve and the retainer to be engaged with the second component.

In another aspect of the present disclosure, a pin joint for coupling a first component with a second component is disclosed. The pin joint includes a shell disposed within an opening in the first component. The shell has a bore, a first coupling portion, and a second coupling portion, positioned axially opposite to the first coupling portion. The pin joint further includes a sleeve disposed concentrically within the bore of the shell. The pin joint includes a first retainer. The first retainer is disposed proximal to a first end of the sleeve. The first retainer is detachably coupled to the first coupling portion of the shell. The pint joint further includes a second retainer. The second retainer is disposed proximal to a second end of the sleeve. The second retainer is detachably coupled to the second coupling portion of the shell. The first retainer and the second retainer are configured to axially retain the sleeve within the bore of the shell. The pint joint further includes a pin. The pin is received through the sleeve, the first retainer, and the second retainer. The pin is configured to engage with the second component.

In yet another aspect of the present disclosure, a method of assembling the pin joint for coupling the first component with the second component is provided. The method includes receiving a shell having a bore within an opening of the first component. The method also includes slidably receiving a sleeve within the bore of the shell. The method further includes detachably coupling a retainer with the coupling portion. The retainer restricts axial movement of the sleeve within the bore of the shell. The method also includes aligning the second component within the opening of the first component. The method includes slidably receiving a pin through the sleeve and the retainer. The method also includes engaging the pin with the second component.

Other features and aspects of this disclosure will be apparent from the following description and the accompanying drawings.

DETAILED DESCRIPTION

Figure 1:
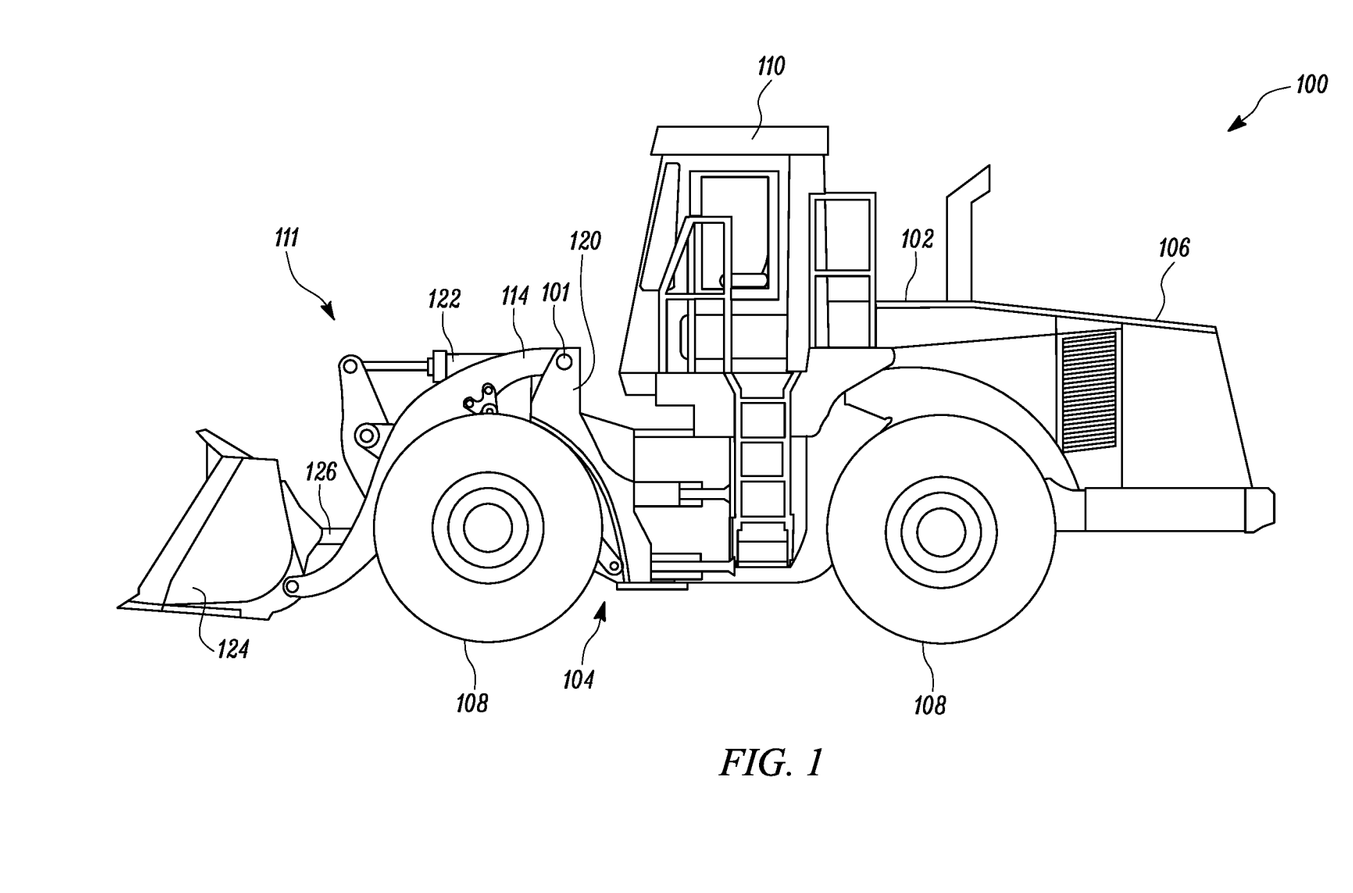
FIG. 1 is a side view of a machine having a pin joint for connecting a first component and a second component of an implement system, according to an embodiment of the present disclosure.

Wherever possible, the same reference numbers will be used throughout the drawings to refer to the same or the like parts. FIG. 1 illustrates a side view of a machine 100 having a pin joint 101, according to an embodiment of the present disclosure. In the illustrated embodiment, the machine 100 is a wheel loader. It should be understood that the machine 100 may alternatively include machines, such as an excavator, a back hoe loader and a dozer, used in various industries, such as mining, transportation, construction, forestry, and agri culture.

The machine 100 includes a frame 102 with a front portion 104. A powertrain (not shown) may be provided in the machine 100 for generation and transmission of a motive power to propel the machine 100. The powertrain may include a power source, which may be located within an enclosure 106 of the machine 100. The machine 100 further includes a set of ground engaging members 108, such as wheels, for the purpose of mobility based on the motive power received from the power train. The machine 100 further includes an operator cabin 110, which may house controls for operating the machine 100.

The machine 100 further includes an implement system 111 coupled to the front portion 104 of the frame 102. More specifically, the implement system 111 may be coupled to the frame 102 of the machine 100 via a pair of arms 114. One of the pair of arms 114, hereinafter referred to as 'the first component 114' is shown in FIG. 1. In the illustrated embodiment, the frame 102 includes a pair of vertical extensions 120 disposed at the front portion 104 of the machine 100. One of the pair of vertical extensions 120, hereinafter referred to as 'the second component 120' is shown in FIG. 1. The second component 120 may be a stationary part of the front portion 104 of the frame 102. The second component 120 includes spaced flanges 112 (shown in FIG. 2). The pin joint 101 pivotally connects the first component 114 to the spaced flanges 112 of the second component 120. The pin joint 101 may enable pivotal movement of the first component 114 relative to the second component 120.

One or more hydraulic cylinders 122 may be coupled to the first component 114 to raise or lower the first component 114 relative to the second component 120. An implement 124, in the form of a bucket, may be pivotally connected to the first component 114 by the pin joint 101. A tilt linkage assembly 126 may also be connected between the implement 124 and the first component 114 using the pin joint 101. The tilt linkage assembly 126 may enable the implement 124 to pivot with respect to the first component 114.

The implement system 111, as described above, is for illustrative purposes, and various alternative implement systems including one or more pin joints 101 may be contemplated within the scope of the present disclosure. The implement system 111 may vary based on a type of the machine 100 and operations to be performed. Accordingly, dimensional specification of the pin joint 101 may vary. Although the pin joint 101 of the present disclosure is illustrated with reference to the machine 100 having the first component 114 and the second component 120, it may be understood that the pin joint 101 may be implemented for pivotally coupling two components associated with any machine or two components of a mechanical linkage assembly used in various applications.

Figure 2:
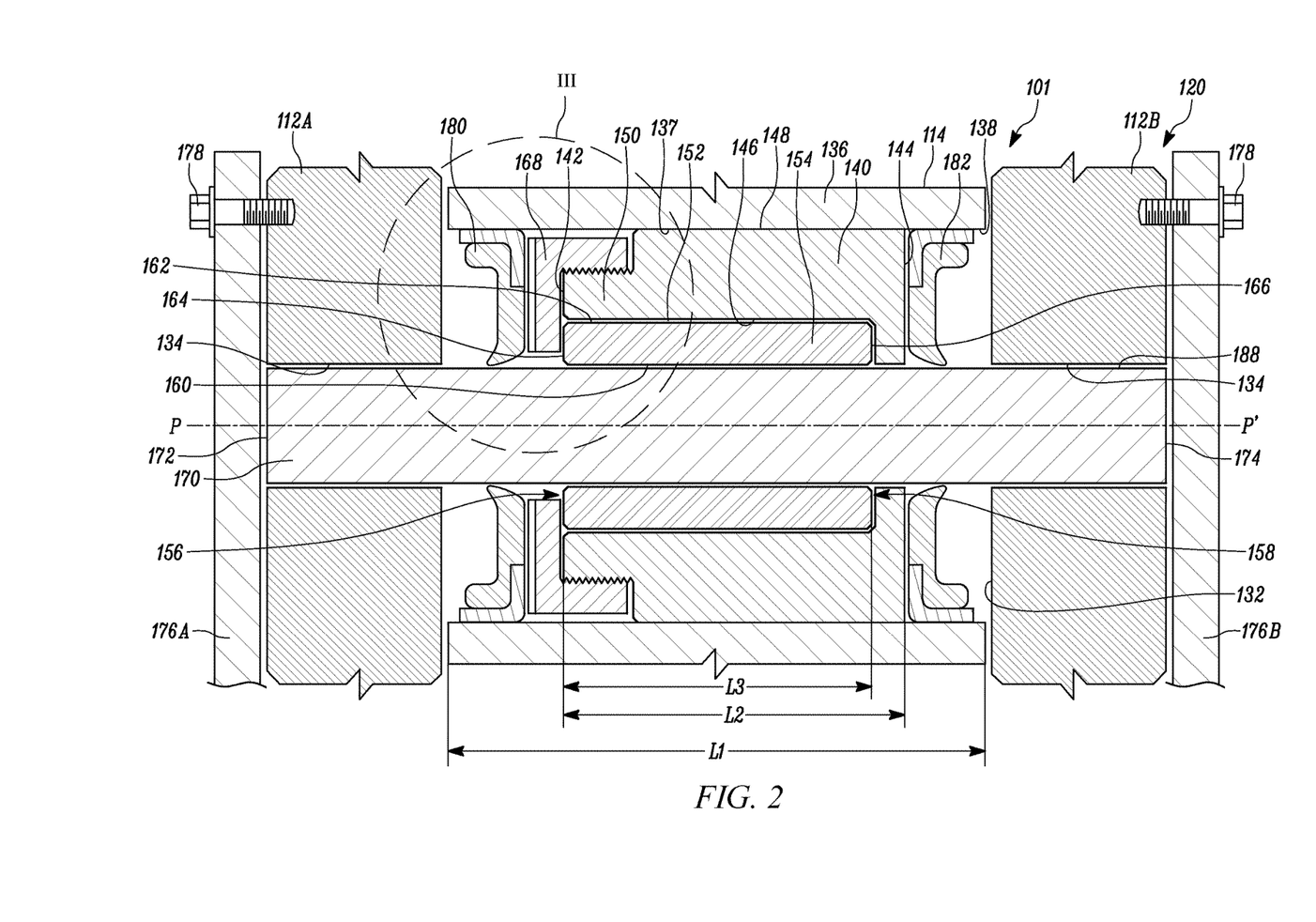
FIG. 2 is a cross sectional view of the pin joint of the implement system of FIG. 1, according to an embodiment of the present disclosure.

FIG. 2 illustrates a sectional view of the pin joint 101, according to an embodiment of the present disclosure. The pin joint 101 pivotally couples the first component 114 to the spaced flanges 112, individually referred to as a first flange 112A and a second flange 112B, of the second component 120. As such, the first component 114 may move relative to the second component 120 about a pivot axis P-P' of the pin joint 101. The first flange 112A and the second flange 112B are spaced apart from each other. The first flange 112A and the second flange 112B may be substantially cylindrical about the pivot axis P-P'. The second component 120 includes an opening 132 formed between the first flange 112A and the second flange 112B. The first flange 112A and the second flange 112B define bores 134. The bores 134 of the first flange 112A and the second flange 112B are axially aligned with each other. The first component 114 includes a housing 136 configured to be at least partly received within the opening 132 formed between the first flange 112A and the second flange 112B. In an embodiment, the housing 136 has a length 11'. The housing 136 may be substantially cylindrical about the pivot axis P-P'. The housing 136 includes an opening 138 axially aligned with the bores 134 of the first flange 112A and the second flange 112B. In an embodiment, the second component 120 is stationary and the first component 114 is pivotal relative to the second component 120. In some embodiments, the first component 114 and the second component 120 may move relative to each other about the pivot axis P-P' of the pin joint 101.

The pin joint 101 further includes a shell 140 disposed within the opening 138 of the housing 136 of the first component 114. The shell 140 is enclosed by each of the first flange 112A and the second flange 112B of the second component 120. The shell 140 has a length 'L2' defined between a first end 142 and a second end 144 of the shell 140. The length 'L2' of the shell 140 is less than the length 'L1' of the housing 136 of the first component 114. The shell 140 further includes an inner surface 146 and an outer surface 148 distal to the inner surface 146 extending between the first end 142 and the second end 144. The shell 140 includes a coupling portion 150 and a bore 152 that is concentric with the opening 138 of the housing 136. In the present embodiment, the shell 140 is retained within the opening 138 of the first component 114 by a press fit such that the shell 140 is fixedly coupled to the housing 136 of the first component 114. In some embodiments, the shell 140 may be secured in the housing 136 by a coupling process such as welding, fasteners such as bolts, and adhesives.

The pin joint 101 further includes a sleeve 154 co-axially received within the bore 152 of the shell 140. The sleeve 154 is a hollow cylindrical body having a length 'L3' defined between a first end 156 and a second end 158 of the sleeve 154. The sleeve 154 further includes an inner surface 160 and an outer surface 162 distal to the inner surface 160 extending between the first end 156 and the second end 158. The sleeve 154 further includes a first lateral surface 164 defined at the first end 156 of the sleeve 154 and a second lateral surface 166 defined at the second end 158 of the sleeve 154. The sleeve 154 is retained within the bore 152 of the shell 140 by a sliding fit such that the sleeve 154 is rotatable with respect to the shell 140 about the pivot axis P-P'. The first lateral surface 164 and the second lateral surface 166 of the sleeve 154 are substantially perpendicular to the pivot axis P-P'.

The sleeve 154 may be manufactured by processes such as extrusion, casting, and molding. The sleeve 154 may be one of a machined metal tube stock bearing, an extruded plastic tube stock bearing, a laminated bi-metallic bearing, a powdered metal bearing and a composite non-metallic bearing (e.g., a fiber and resin composite). The sleeve 154 may be made of bearing material, such as steel, and bronze. In an embodiment, each of the inner surface 160, the outer surface 162, the first lateral surface 164, and the second lateral surface 166 may include a coating (not sown). In an alternative embodiment, the inner surface 160 and the outer surface 162 may include the coating, and the first and second lateral surface 164, 166 may not include the coating. Further, the inner surface 146 of the shell 140 may include a coating (not shown). The coating may be a lubricant coating that may be at least one of graphite, Polytetrafluoroethylene (PTFE), and molybdenum disulfide. In another embodiment, the coating may be a wear resistant coating that may be at least one of High Velocity Oxy Fuel (HVOF) chrome carbide, and laser clad stainless steel. In yet another embodiment, the coating may be a composite coating containing elemental molybdenum (Mo), for example, Cu-15Ni-8Sn and Mo, and brass and Mo. The coating may be provided by thermal spraying, laser cladding, or any other known methods. Alternatively, grease or any other suitable lubricant may be used to provide lubrication instead of coating.

The pin joint 101 also includes a retainer 168 disposed proximal to the first end 156 of the sleeve 154. More specifically, the retainer 168 is detachably coupled to the coupling portion 150 of the shell 140 and contact with the first lateral surface 164 of the sleeve 154. The retainer 168 is configured to retain the sleeve 154 axially within the bore 152 of the shell 140 and, particularly, configured to restrict lateral movement of the sleeve 154 along the pivot axis P-P'.

The pin joint 101 further includes a pin 170 slidably received through the sleeve 154 and the retainer 168, and engaged with the first flange 112A and the second flange 112B of the second component 120 to pivotally couple the first component 114 with the second component 120. An outer surface 188 of the pin 170 is in contact with the inner surface 160 of the sleeve 154. In an embodiment, the sleeve 154 may be disposed between the pin 170 and the shell 140 by a zero clearance fit. It may be contemplated that an outer diameter of the pin 170 may be substantially equal to an inner diameter of the sleeve 154 along with the coating. The zero clearance fit may become a sliding fit between the sleeve 154 and the pin 170 during an operation of the machine 100. The zero clearance fit may become a sliding fit between the sleeve 154 and the shell 140 during relative movement between the first component 114 and the second component 120 during an operation of the machine 100. The sliding fit between the sleeve 154 and the pin 170 may enable the inner surface 160 of the sleeve 154 to rotate freely with respect to the outer surface 188 of the pin 170. Similarly, the sliding fit between the sleeve 154 and the shell 140 may enable the sleeve 154 to rotate freely with respect to the inner surface 146 of the shell 140. In an example, a lubricant such as grease may be used in addition to the coatings of the pin 170, the shell 140 and the sleeve 154.

The pin 170 of the pin joint 101 is at least partly received within the bores 134 of the first and second flange 112A and 112B. More specifically, a first end 172 of the pin 170 is received within the bores 134 of the first flange 112A and a second end 174 is received within the bores 134 of the second flange 112B. The pin 170 may be axially retained within the second component 120 by a pair of plates 176, individually referred to as a first plate 176A and a second plate 176B. As shown in FIG. 2, each of the pair of plates 176 is coupled to each of the first and second flange 112A, 112B by fasteners 178. In an embodiment, the pin 170 may also be rotationally retained by each of the pair of plates 176. The rotational retention of the pin 170 may be achieved by coupling at least one of the pair of plates 176 with one of the first and second flange 112A and 112B by the fasteners 178 or any other known methods. Further, each of the pair of plates 176 may also absorb thrust loads exerted by the pin 170.

The pin joint 101 also comprises a first sealing member 180 disposed proximal to the retainer 168 between the opening 138 of the housing 136 of the first component 114 and the pin 170. Further, a second sealing member 182 is disposed proximal to the second end 144 of the shell 140 between the opening 138 of the housing 136 of the first component 114 and the pin 170. The first sealing member 180 and the second sealing member 182 are identical in terms of construction and structure. Hence, the first sealing member 180 is discussed in detail herein below for illustration purpose of the present disclosure. The first sealing member 180 is hereinafter referred to as 'the sealing member 180'. The sealing member 180 is an annular ring body having a metal component and an elastomeric member coupled to the metal component and facing radially inwardly toward the pin 170. The metal component is configured to engage with an inner surface 137 of the housing 136 of the first component 114 and the elastomeric member is configured to engage with the outer surface 188 of the pin 170. The sealing member 180 is configured to maintain a fluid tight seal between the pin 170 and the housing 136 of the first component 114. Thus, the sealing member 180 may restrict entry of debris, dust, or any other foreign material from entering the opening 138 of the housing 136, particularly, the bore 152 of the shell 140 and a clearance defined between the sleeve 154 and the pin 170. In an embodiment, the sealing member 180 may be detachably coupled to the retainer 168 such that the sealing member 180 may be conveniently detached from the retainer 168 for easy replacement of the sleeve 154. The pin joint 101, as described above, is exemplary in nature and variations are possible within the scope of the present disclosure.

Figure 3:
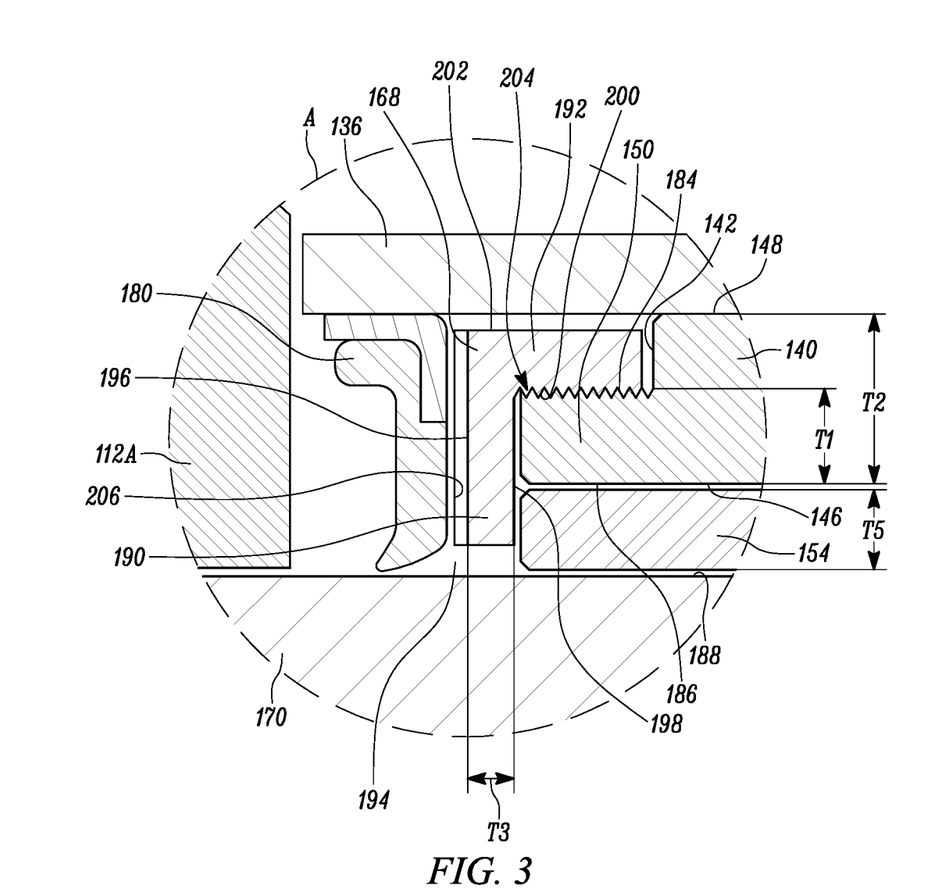
FIG. 3 is an enlarged view of a portion of the sectional view of the pin joint, illustrated in FIG. 2.

FIG. 3 illustrates an enlarged view of a portion 'A' of the pin joint 101 of FIG. 2. The coupling portion 150 is defined at the first end 142 of the shell 140 and extends axially along the pivot axis P-P'. More specifically, the coupling portion 150 is defined adjacent to the inner surface 146 of the shell 140. The coupling portion 150 of the shell 140 has an outer surface 184 facing radially outwardly away from the pin 170. The coupling portion 150 has a thickness 'T1' defined between the outer surface 184 and an inner surface 186. The inner surface 186 of the coupling portion 150 is aligned with the inner surface 146 of the shell 140. The thickness 'T1' of the coupling portion 150 is less than a thickness 'T2' of the shell 140 defined between the inner surface 146 and the outer surface 148 of the shell 140. The outer surface 184 of the coupling portion 150 is provided with threads to detachably couple with the retainer 168.

The retainer 168 is a hollow cylindrical structure having a base portion 190 and an elongated portion 192 extending radially from the base portion 190. The base portion 190 includes a through hole 194 configured to receive the pin 170 therethrough. The through hole 194 has an inner diameter greater than the outer diameter of the pin 170 such that the pin 170 is freely received through the through hole 194 of the base portion 190 during assembly of the first component 114 and the second component 120. The base portion 190 further includes an outer face 196 and an inner face 198 distal to the outer face 196. A thickness 'T3' of the base portion 190 is defined between the outer face 196 and the inner face 198. The thickness 'T3' of the base portion 190 is defined based on the length L1 of the housing 136 of the first component 114 and the length 'L2' of the shell 140. The elongated portion 192 includes an inner surface 200 facing radially inwardly toward the pin 170 and an outer surface 202 aligned with the outer face 196 of the base portion 190. The inner surface 200 of the elongated portion 192 is configured to engage with the outer surface 184 of the coupling portion 150. More specifically, the inner surface 200 of the elongated portion 192 is provided with threads corresponding to the threads of the coupling portion 150. Hence, the elongated portion 192 of the retainer 168 is coupled to the coupling portion 150 of the shell 140 using a threaded connection 204. Thus, the retainer 168 is secured to the coupling portion 150 of the shell 140 by the threaded connection 204.

The retainer 168 is disposed proximate to the first end 156 of the sleeve 154. In the assembled condition, the inner face 198 of the base portion 190 of the retainer 168 contacts with the first lateral surface 164 of the sleeve 154. Thus, the retainer 168 is configured to restrict movement of the sleeve 154 within the bore 152 of the shell 140.

The retainer 168 includes an engaging portion 206 defined on the outer face 196 of the base portion 190. In the present embodiment, the engaging portion 206 may be defined as a pair of grooves on the outer face 196 of the base portion 190. Each of the pair of grooves is defined on the outer face 196 of the base portion 190 diametrically opposite to each other. In another embodiment, the engaging portion 206 may be one or more of a slot, a cut out, and a blind hole defined on the outer face 196 of the base portion 190. In some embodiments, the engaging portion 206 may be a projection extending from the outer face 196 of the base portion 190. The engaging portion 206 is configured to selectively engage with a tool. The tool may have a tool tip configured to engage with the engaging portion 206 of the base portion 190. The tool may be an external instrument used to facilitate coupling or decoupling with or from the sleeve 154.

Figure 4:
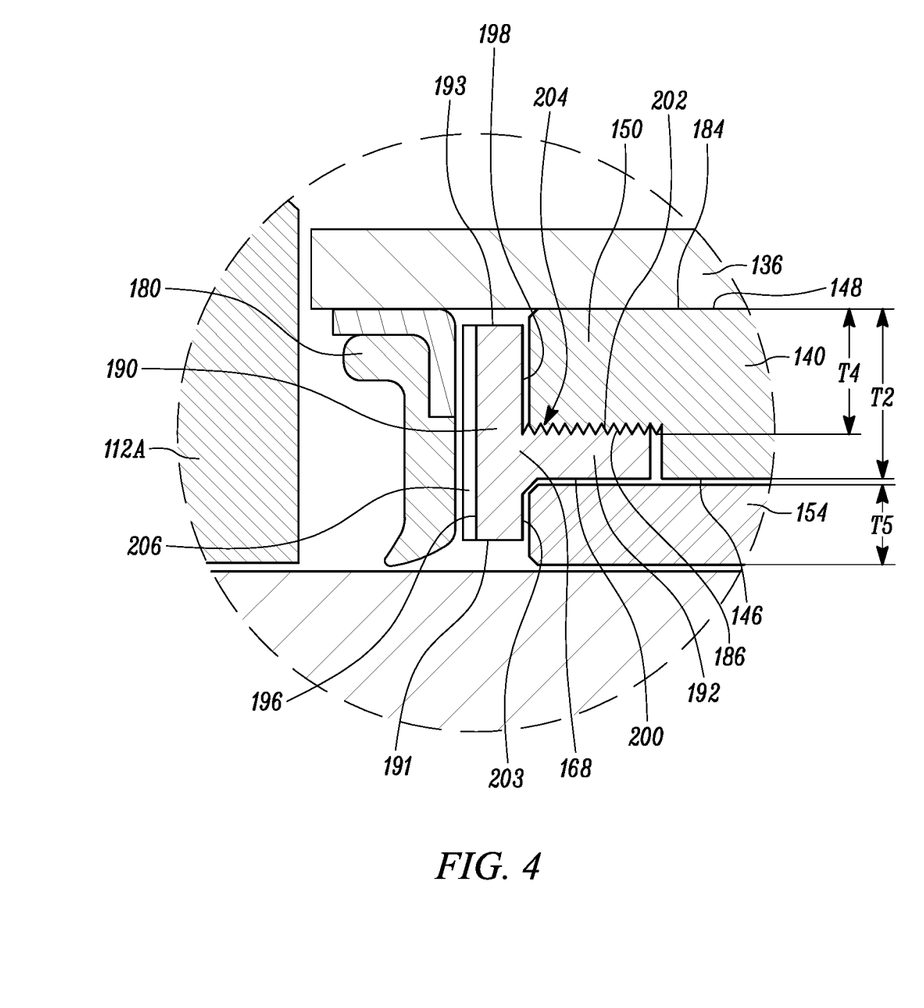
FIG. 4 is an enlarged view of a portion of the sectional view of the pin joint, according to yet another embodiment of the present disclosure.

FIG. 4 illustrates an enlarged view of the portion 'A' of the pin joint 101 according to another embodiment of the present disclosure. For the sake of brevity, the aspects of the present disclosure which are already explained in detail in the description of FIG. 2 and FIG. 3 are not explained in detail with regard to the description of FIG. 4. The coupling portion 150 is defined at the first end 142 of the shell 140 and extends axially along the pivot axis P-P'. More specifically, the coupling portion 150 is defined adjacent to the outer surface 148 of the shell 140. The coupling portion 150 has a thickness 'T4' defined between the outer surface 184 and the inner surface 186. The outer surface 184 of the coupling portion 150 is aligned with the outer surface 148 of the shell 140. The thickness 'T4' of the coupling portion 150 is less than the thickness 'T2' of the shell 140 defined between the inner surface 146 and the outer surface 148. The inner surface 146 of the coupling portion 150 is provided with threads to detachably couple with the retainer 168.

The retainer 168 includes the base portion 190. The base portion 190 includes a first surface 191 and a second surface 193 opposite to the first surface 191, defining a width 'W' of the base portion 190. The elongated portion 192 extends radially from the inner face 198 of the base portion 190. The elongated portion 192 includes the inner surface 200 and the outer surface 202 distal to the inner surface 200 defining a thickness 'T3' of the elongated portion 192. A step portion 203 is defined between the first surface 191 of the base portion 190 and the inner surface 200 of the elongated portion 192. A width of the step portion 203 may correspond to a thickness 'T5' of the sleeve 154. The outer surface 202 of the elongated portion 192 is configured to engage with the inner surface 186 of the coupling portion 150. More specifically, the outer surface 202 of the elongated portion 192 is provided with threads corresponding to the threads of the coupling portion 150. Hence, the elongated portion 192 of the retainer 168 is coupled to the coupling portion 150 of the shell 140 using the threaded connection 204. Thus, the retainer 168 is secured to the coupling portion 150 of the shell 140 by the threaded connection 204. The inner surface 200 of the elongated portion 192 is aligned with the inner surface 146 of the shell 140.

Figure 5:
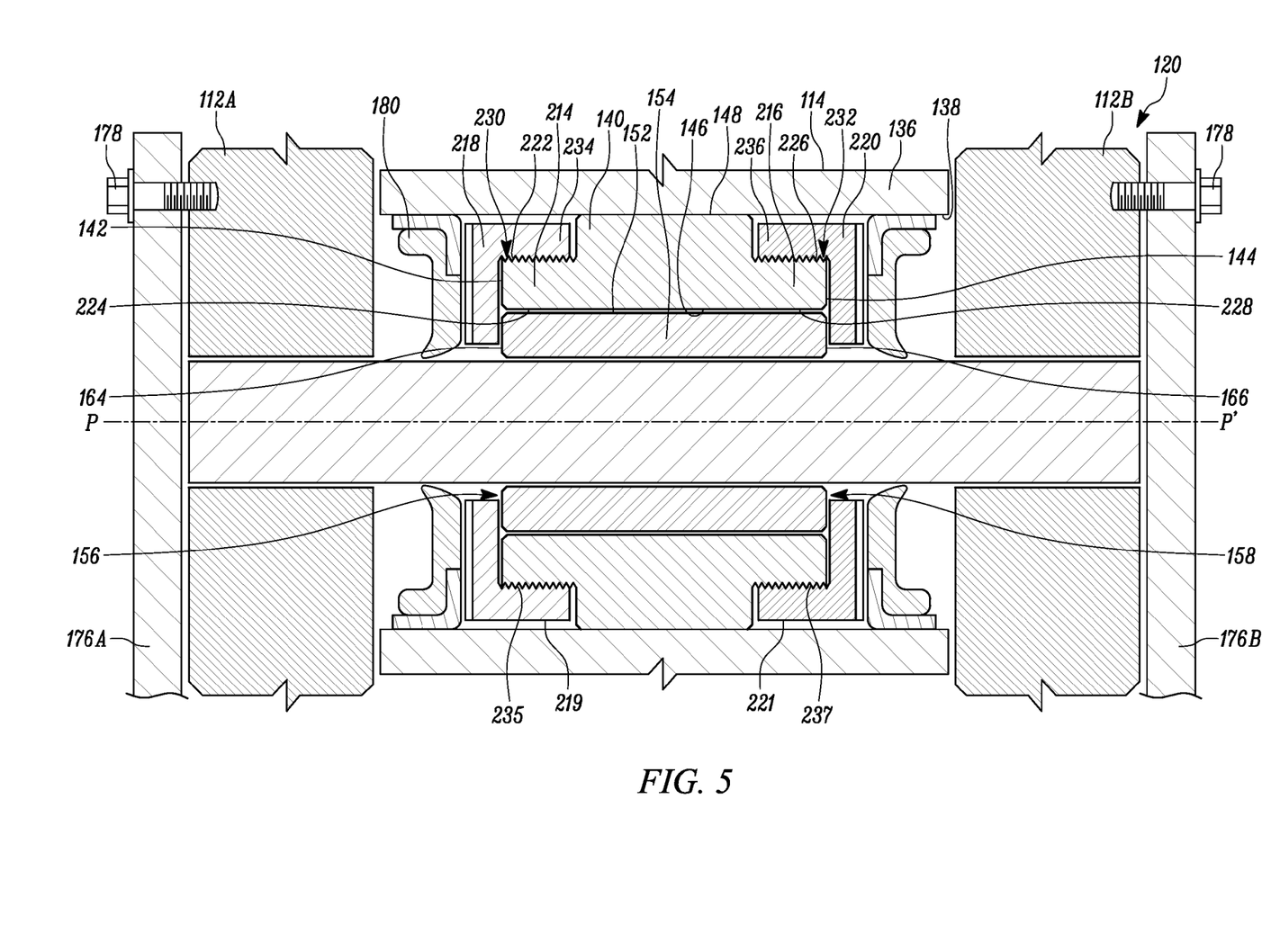
FIG. 5 is a cross sectional view of the pin joint of the implement system of FIG. 1, according to a further embodiment of the present disclosure.

FIG. 5 is a cross sectional view of the pin joint 101 of the implement system 111 of FIG. 1, according to a further embodiment of the present disclosure. For the sake of brevity, the aspects of the present disclosure which are already explained in detail in the description of FIG. 2, FIG. 3, and FIG. 4 are not explained in detail with regard to the description of FIG. 5.

The shell 140 of the pin joint 101 includes a first coupling portion 214, and a second coupling portion 216 that is concentric with the opening 138 of the housing 136 and the bore 152 of the shell 140. The first coupling portion 214 is positioned axially opposite to the second coupling portion 216. The first coupling portion 214 is defined at the first end 142 of the shell 140 and extends axially along the pivot axis P-P'. More specifically, the first coupling portion 214 is defined adjacent to the inner surface 146 of the shell 140. The first coupling portion 214 of the shell 140 has an outer surface 222 facing radially outwardly away from the pin 170. The first coupling portion 214 has a thickness defined between the outer surface 222 and an inner surface 224. The inner surface 224 of the first coupling portion 214 is aligned with the inner surface 146 of the shell 140. The thickness of the first coupling portion 214 is less than the thickness 'T2' of the shell 140 defined between the inner surface 146 and the outer surface 148 of the shell 140. The outer surface 222 of the first coupling portion 214 is provided with threads to detachably couple with the first retainer 218. The pin joint 101 further includes a first retainer 218. The first retainer 218 has a first elongated portion 234. The first elongated portion 234 has an inner surface 235 facing radially inwardly toward the pin 170. The first retainer 218 is coupled to the first coupling portions 214 using a first threaded connection 230. More specifically, the first threaded connection 230 is disposed between an inner surface 235 of the first elongated portion 234 of the first retainer 218 and the first coupling portion 214. The first elongated portion 234 of the first retainer 218 has an outer surface 219 facing radially outwardly away from the pin 170. The outer surface 219 of the first elongated portion 234 is configured to engage with the inner surface 224 of the first coupling portion 214.

The second coupling portion 216 is defined at the second end 144 of the shell 140 and extends axially along the pivot axis P-P'. More specifically, the second coupling portion 216 is defined adjacent to the inner surface 146 of the shell 140. The second coupling portion 216 of the shell 140 has an outer surface 226 facing radially outwardly away from the pin 170 and an inner surface 228 opposite to the outer surface 226. In one example, the first coupling portion 214 and the second coupling portion 216 may have substantially same thickness. The pin joint 101 further includes a second retainer 220. The outer surface 226 of the second coupling portion 216 is provided with threads to detachably couple with the second retainer 220. The second retainer 220 has a second elongated portion 236. The second elongated portion 236 has an inner surface 237 facing radially inwardly toward the pin 170. The second retainer 220 is coupled to the second coupling portion 216 using a second threaded connection 232. More specifically, the second threaded connection 232 is disposed between the inner surface 237 of the second elongated portion 236 of the second retainer 220 and the second coupling portion 216. The second elongated portion 236 of the second retainer 220 has an outer surface 221 facing radially outwardly away from the pin 170. The outer surface 221 of the second elongated portion 236 is configured to engage with the inner surface 228 of the second coupling portion 216. The first retainer 218 and the second retainer 220 are configured to axially retain the sleeve 154 within the bore 152 of the shell 140.

INDUSTRIAL APPLICABILITY

The present disclosure relates the pin joint 101 and a method 238 of assembling the pin joint 101. The pin joint 101 may pivotally connect the second component 120 with the first component 114 of the implement system 111 of the machine 100. An exemplary operation of the pin joint 101 will be described hereinafter. During a pivotal movement of the first component 114 relative to the second component 120, the inner surface 160 of the sleeve 154 and the outer surface 188 of the pin 170 may be freely rotatable with respect to each other due to the sliding fit therebetween. Further, the coatings and on the sleeve 154 and the pin 170, respectively, may minimize friction and wear. Further, the coating on the sleeve 154 may minimize friction and wear.

The sleeve 154 may prevent direct contact between the housing 136 and the pin 170 as the shell 140 is disposed therebetween. This may prevent galling between the housing 136 and the pin 170. Further, a material of the sleeve 154 may be chosen such that the sleeve 154 acts as a sacrificial component, thereby preventing substantial wear and/or failure of the shell 140 and the pin 170. Therefore, maintenance and/or replacement costs of the shell 140 and the pin 170 may be reduced. The material and/or design of the sleeve 154 may also be selected based on design requirements of the pin joint 101. For example, based on lubrication requirements, inner and outer surfaces 160, 162 of the sleeve 154 may be modified by providing recesses, pockets, and the like. Moreover, the sleeve 154 may enable the sliding fit on the inner and outer surfaces 160, 162 of the sleeve 154, thereof. Therefore, in case there is a failure and/or adhesion at one of the sliding fit, the other sliding fit may enable a functioning of the pin joint 101. The sleeve 154 may require periodic replacement due to wear.

The pin joint 101 of the present disclosure may be implemented in large machines/heavy duty machines, such as excavator used in mining industry, and small machines, such as skid steer loader, used in construction industry. In small machines, assembly and disassembly of the pin joint 101 is easy and quick due to threaded coupling of the retainer 168 with the shell 140. Further, the engaging portion 206 of the retainer 168 is designed in such a way that an operator may use any type of tool to perform servicing of the pin joint 101, which would otherwise demand specific tools to remove and to install conventional pin joints. In large machines, as usage of a service press, which is generally used for servicing the conventional pin joint, is eliminated, down time for the servicing of the pin joint 101 is reduced. Thus, the pin joint 101 of present disclosure may be conveniently assembled, disassembled or serviced irrespective of the size of the machine 100 and the application thereof.

Figure 6:
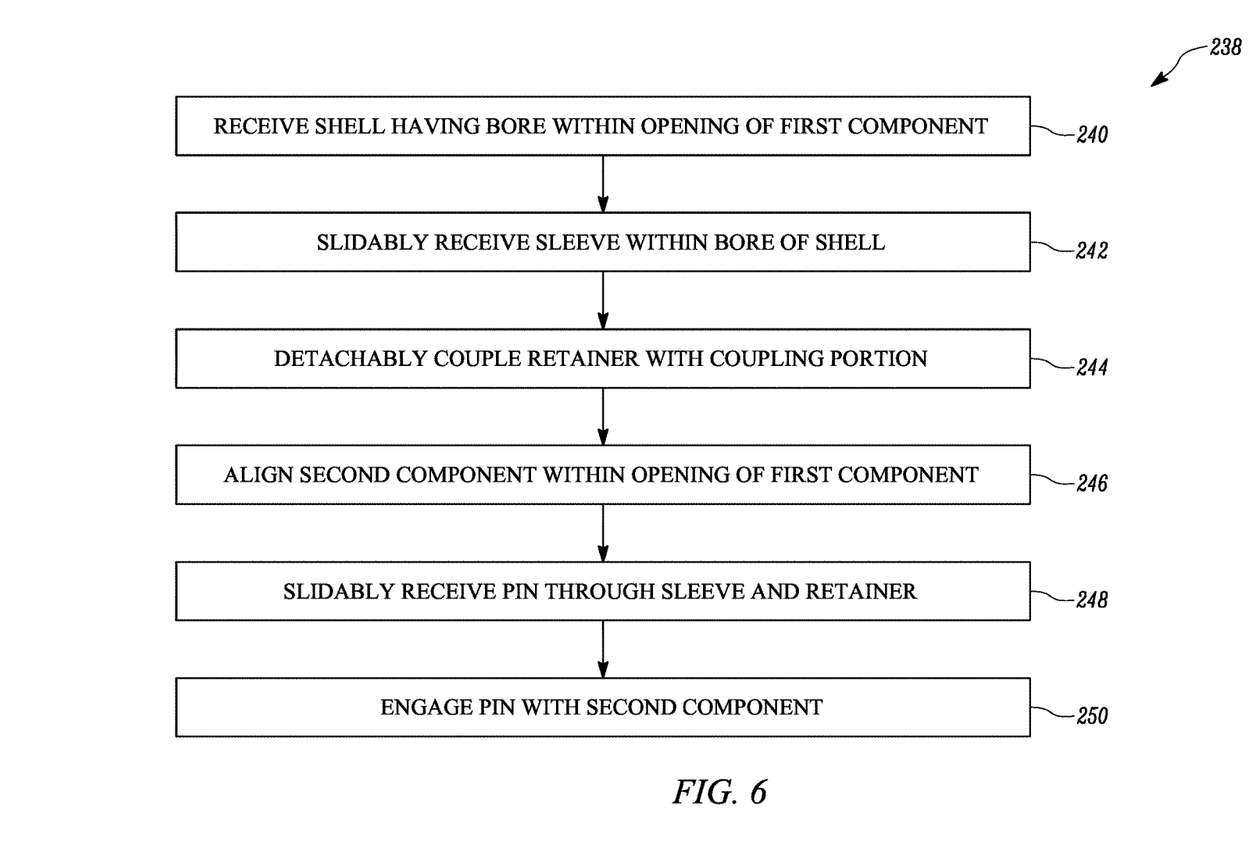
FIG. 6 is a flowchart illustrating a method for assembling the pin joint for coupling components of the implement system of FIG. 1, according to an embodiment of the present disclosure.

FIG. 6 illustrates a flowchart of the method 238 for assembling the pin joint 101, according to an embodiment of the present disclosure. For the sake of brevity, the aspects of the present disclosure which are already explained in detail in the description of FIG. 1, FIG. 2, FIG. 3, FIG. 4, and FIG. 5 are not explained in detail with regard to the description of the method 238. At step 240, the method 238 includes receiving the shell 140 having the bore 152 within the opening 132 of the first component 114 of the machine 100 that is stationary.

At step 242, the method 238 includes slidably receiving the sleeve 154 within the bore 152 of the shell 140. The sleeve 154 is secured within the bore 152 of the shell 140 and the outer surface 162 of the sleeve 154 touches the inner surface 146 of the shell 140 and the base portion 190 of the retainer 168.

At step 244, the method 238 also includes detachably coupling the retainer 168 with the coupling portion 150 of the shell 140. The sleeve 154 is disposed proximal to the base portion 190 the retainer 168. The inner surface 200 of the elongated portion 192 of the retainer 168 is detachably coupled with the outer surface 184 of the coupling portion 150 of the shell 140. The retainer 168 restricts axial movement of the sleeve 154 within the bore 152 of the shell 140.

At step 246, the method 238 further includes aligning the second component 120 within the opening 138 of the first component 114 to enable coupling of the second component 120 with the first component 114. At step 248, the method 238 further includes slidably receiving the pin 170 through the sleeve 154 and the retainer 168. The pin 170 is concentrically received within the sleeve 154. The outer surface 188 of the pin 170 touches each of the first and second sealing members 180, 182. The housing 136 encloses the shell 140, the sleeve 154, the retainer 168 and the first and second sealing members 180, 182 together. At step 250, the method 238 further includes engaging the pin 170 with the first component 114 and the second component 120. The pin joint 101 couples the second component 120 with the first component 114 using the pin 170 that is received in the opening 138 of the first component 114.

The method 238 of disassembling the pin joint 101 for replacement of the sleeve 154 may include removing the shell 140 from the housing 136 by decoupling the engaging portion 206 from the retainer 168. The pin 170 may be then slid out of the sleeve 154. The sealing members 180, 182 may be then removed from the sleeve 154. The retainer 168 is detached from the coupling portion 150. Subsequently, the sleeve 154 is removed from the bore 152 of the shell 140. A new sleeve (not shown) may be the inserted within the bore 152 of the shell 140 and the pin joint 101 may be assembled accordingly. Thus, the pin joint 101 may allow easy and quick replacement of the sleeve 154 without requiring any special tools, such as a hydraulic press.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A pin joint for coupling a first component with a second component, the pin joint comprising:
    a shell disposed within an opening in the first component, the shell having a bore and a coupling portion;
    a sleeve disposed concentrically within the bore of the shell;
    a retainer disposed proximal to an end of the sleeve and detachably coupled directly to the coupling portion of the shell, the retainer configured to axially retain the sleeve within the bore of the shell; and
    a pin received through the sleeve and the retainer, and engaged with the second component, wherein
    an end of the sleeve is aligned with an end of the shell; and
    the retainer does not contact the pin.

2. The pin joint of claim 1, wherein the retainer comprises:
    a base portion configured to receive the pin therethrough; and
    an elongated portion extending from the base portion, the elongated portion configured to engage with the coupling portion.

3. The pin joint of claim 2, wherein
    the coupling portion has an outer surface facing radially outwardly away from the pin; and
    the elongated portion has an inner surface facing radially inwardly toward the pin, wherein the inner surface of the elongated portion is configured to engage with the outer surface of the coupling portion.

4. The pin joint of claim 2, wherein
    the coupling portion has an inner surface facing radially inwardly toward the pin; and
    the elongated portion has an outer surface facing radially outwardly away from the pin, wherein the outer surface of the elongated portion is configured to engage with the inner surface of the coupling portion.

5. The pin joint of claim 1, wherein the retainer is secured to the coupling portion by a threaded connection.

6. The pin joint of claim 1, wherein the shell is retained within the opening of the first component by a press fit.

7. The pin joint of claim 1, wherein the sleeve is disposed within the bore of the shell by a sliding fit.

8. The pin joint of claim 1 further comprising a sealing member disposed between the opening of the first component and the pin proximal to the retainer.

9. The pin joint of claim 1, wherein the retainer comprises an engaging portion configured to selectively engage with a tool.

10. The pin joint of claim 1, wherein the shell directly contacts a housing of the first component that defines the opening.

11. A pin joint for coupling a first component with a second component, the pin joint comprising:
    a shell disposed within an opening in the first component, the shell having a bore, a first coupling portion, and a second coupling portion positioned axially opposite to the first coupling portion;
    a sleeve disposed concentrically within the bore of the shell;
    a first retainer disposed proximal to a first end of the sleeve and detachably coupled directly to the first coupling portion of the shell;
    a second retainer disposed proximal to a second end of the sleeve and detachably coupled directly to the second coupling portion of the shell, wherein the first retainer and the second retainer are configured to axially retain the sleeve within the bore of the shell; and
    a pin received through the sleeve, the first retainer, and the second retainer, and configured to engage with the second component, wherein
    at least one end of the sleeve is aligned with a corresponding at least one end of the shell; and
    the retainer does not contact the pin.

12. The pin joint of claim 11, wherein each of the first retainer and the second retainer comprises:
    a base portion configured to receive the pin therethrough; and
    an elongated portion extending from the base portion, the elongated portion configured to engage with each of the first coupling portion and the second coupling portion of the shell.

13. The pin joint of claim 12, wherein
    at least one of the first coupling portion and the second coupling portion has an outer surface facing radially outwardly away from the pin; and
    the elongated portion of at least one of the first retainer and the second retainer has an inner surface facing radially inwardly toward the pin, wherein the inner surface of the elongated portion of the at least one of the first retainer and the second retainer is configured to engage with the outer surface of the at least one of the first coupling portion and the second coupling portion of the shell.

14. The pin joint of claim 12, wherein
    at least one of the first coupling portion and the second coupling portion has an inner surface facing radially inwardly toward the pin; and
    the elongated portion of at least one of the first retainer and the second retainer has an outer surface facing radially outwardly away from the pin, wherein the outer surface of the elongated portion of the at least one of the first retainer and the second retainer is configured to engage with the inner surface of the at least one of the first coupling portion and the second coupling portion of the shell.

15. The pin joint of claim 11, wherein the first retainer and the second retainer is secured to the first coupling portion and the second coupling portion, respectively, by a threaded connection.

16. The pin joint of claim 11, wherein the shell is disposed within the opening of the first component by a press fit.

17. The pin joint of claim 11, wherein the sleeve is disposed within the bore of the shell by a sliding fit.

18. The pin joint of claim 11 further comprising a sealing member disposed between the opening of the first component and the pin proximal to at least one of the first retainer and the second retainer.

19. The pin joint of claim 11, wherein each of the first retainer and the second retainer comprises an engaging portion configured to selectively engage with a tool.

20. A method of assembling a pin joint for coupling a first component with a second component, the method comprising:
    receiving a shell having a bore within an opening of the first component, wherein the shell comprises a coupling portion;
    slidably receiving a sleeve within the bore of the shell;
    detachably coupling a retainer directly with the coupling portion, wherein the retainer restricts axial movement of the sleeve within the bore of the shell;
    aligning the second component within the opening of the first component;
    slidably receiving a pin through the sleeve and the retainer; and
    engaging the pin with the second component, wherein when the pin joint is assembled, an end of the sleeve is aligned with an end of the shell, and the sleeve is closer to the pin than the retainer is to the pin.

* * * * *